(12) United States Patent  
Wang et al.

(10) Patent No.: US 7,638,586 B2
(45) Date of Patent: Dec. 29, 2009

(54) OLEFIN POLYMERIZATION PROCESS

(75) Inventors: Shaotian Wang, Mason, OH (US); Kenneth J. Klug, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 522 days.

(21) Appl. No.: 11/527,090

(22) Filed: Sep. 26, 2006

(65) Prior Publication Data

US 2008/0076891 A1    Mar. 27, 2008

(51) Int. Cl.
C08F 4/76 (2006.01)
C08F 4/64 (2006.01)
C08F 4/52 (2006.01)
C08F 2/00 (2006.01)

(52) U.S. Cl. .................. 526/172; 526/161; 526/88; 526/129; 526/130; 526/352

(58) Field of Classification Search .......... 526/172, 526/161
See application file for complete search history.

(56) References Cited

U.S. PATENT DOCUMENTS

| 4,808,561 | A | * | 2/1989 | Welborn, Jr. ............... 502/104 |
| 5,763,547 | A | * | 6/1998 | Kolthammer et al. ....... 526/129 |
| 6,211,311 | B1 | | 4/2001 | Wang et al. ................. 526/131 |
| 6,232,260 | B1 | | 5/2001 | Nagy et al. ................. 502/155 |
| 6,390,156 | B1 | * | 5/2002 | Hetherington et al. ...... 141/351 |
| 6,451,724 | B1 | | 9/2002 | Nifant'ev et al. ............ 502/103 |
| 6,559,251 | B1 | | 5/2003 | Wang et al. ................. 526/127 |
| 6,583,242 | B2 | * | 6/2003 | Wang et al. ................. 526/161 |
| 6,756,455 | B2 | * | 6/2004 | Nagy et al. ................. 526/161 |
| 6,794,468 | B1 | | 9/2004 | Wang ........................ 526/161 |
| 6,818,713 | B1 | | 11/2004 | Wang et al. ................. 526/161 |
| 6,838,410 | B2 | | 1/2005 | Wang et al. ................. 502/103 |
| 6,846,943 | B2 | * | 1/2005 | Nakano et al. ............... 556/53 |
| 6,908,972 | B2 | | 6/2005 | Tsuie et al. ................. 526/160 |
| 7,220,806 | B2 | * | 5/2007 | Gauthier et al. ............. 526/170 |

FOREIGN PATENT DOCUMENTS

WO    WO 99/24446    5/1999
WO    WO 01/53360    7/2001

OTHER PUBLICATIONS

Jüngling et al., *J. Organometal. Chem.* 460 (1993) 191.
Noh et al., *J. Organometal. Chem.* 518 (1996) 1.
Noh et al., *J. Organometal. Chem.* 580 (1999) 90.

* cited by examiner

*Primary Examiner*—David Wu
*Assistant Examiner*—Rip A. Lee
(74) *Attorney, Agent, or Firm*—John Tyrell; Jonathan L. Schuchardt

(57) ABSTRACT

A process for polymerizing ethylene is disclosed. The process comprises polymerizing ethylene in a slurry reaction in the presence of a catalyst system which comprises an activator and an indenoindolyl transition metal complex on a support material. The catalyst system is slurried with an inert solvent prior to addition to the reactor. The process provides polyethylene with good bulk density.

9 Claims, No Drawings

OLEFIN POLYMERIZATION PROCESS

FIELD OF THE INVENTION

This invention relates to a slurry process for polymerizing ethylene. The process gives ethylene polymers with increased bulk density.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes, are beginning to replace Ziegler-Natta catalysts.

Catalyst precursors that incorporate a transition metal and an indenoindolyl ligand are known. U.S. Pat. Nos. 6,232,260 and 6,451,724 disclose the use of transition metal catalysts based upon indenoindolyl ligands.

U.S. Pat. No. 6,559,251 discloses a process for polymerizing olefins with a silica-supported, indenoindolyl Group 4-6 transition metal complex having "open architecture." WO 01/53360 discloses similar open architecture indenoindolyl catalysts that may be supported on an inert support. U.S. Pat. No. 6,211,311 teaches that many heterometallocenes are inherently unstable and this causes difficulties in supporting these catalysts and poor catalyst activity. This problem is avoided by using chemically treated supports.

U.S. Pat. No. 6,908,972 discloses a process for polymerizing ethylene in the presence of a silica-supported Group 3-10 transition metal catalyst that has two bridged indenoindolyl ligands. The catalyst is effective for copolymerizing ethylene with α-olefins such as 1-butene or 1-hexene to make low density polyolefins.

When ethylene is polymerized in a slurry process, the polyethylene forms as a powder slurry. This isolated powder has a certain bulk density. The bulk density should not be confused with the more commonly reported polyethylene density, which is the density of the polyethylene prepared from the melt and depends upon branching. Bulk density depends upon the characteristics of the powder. A higher bulk density is desirable because less volume is required to store and ship the powder. Despite the considerable work done with catalysts based upon indenoindolyl ligands, there is a need for improvement, especially with regard to improving bulk density.

SUMMARY OF THE INVENTION

The invention is a process for polymerizing ethylene in a slurry reaction in the presence of a catalyst system. The catalyst system comprises an activator and an indenoindolyl transition metal complex on a support. The catalyst system is slurried with an inert solvent prior to addition to the reactor. The process enables production of polyethylene with increased bulk density.

DETAILED DESCRIPTION OF THE INVENTION

The catalyst system used for the ethylene polymerization comprises an activator and a slurry of a supported indenoindolyl transition metal complex and an inert solvent. We found that slurrying the catalyst system in an inert solvent before adding it to an ethylene polymerization reactor provides an unexpected and valuable boost in polymer bulk density. As the examples and comparative examples below show, the benefit for bulk density is particularly evident when the complex is a bridged, indenoindolyl Group 3-10 metal complex, particularly one supported on silica. We observed a 56-92% increase in bulk density when using a slurry of these supported complexes versus using the usual powder form of the supported complex (see Table 1).

The activator for the catalyst system is selected from the group consisting of alumoxanes, organoboranes, ionic borates, and combinations thereof. Preferably, the activator is an alumoxane. Suitable alumoxanes include methylalumoxane (MAO), polymeric MAO (PMAO), ethylalumoxane, and isobutylalumoxane. Preferably, the alumoxane is methylalumoxane.

Optionally, the ethylene is polymerized in the presence of a second olefin can be added. Suitable olefins are $C_3$-$C_{20}$ α-olefins, such as propylene, 1-butene, 1-hexene, and 1-octene, cyclic olefins such as cyclohexene, and nonconjugated dienes such as ethylidenenorbornene and mixtures thereof. Preferred olefins are 1-butene, 1-hexene, and 1-octene.

Optionally, hydrogen is used in the process to regulate polymer molecular weight. The amount of hydrogen needed depends upon the desired polyolefin molecular weight and flow properties. Generally, as the amount of hydrogen is increased, the polyolefin molecular weight decreases and the melt flow rate increases. For many applications, the polyolefin melt flow rate will be too low if the polymerization is performed in the absence of hydrogen.

The indenoindolyl transition metal complex contains a Group 3 to 10 transition or lanthanide metal. Preferably the transition metal is a Group 3-5 transition metal, more preferably a Group 4 transition metal. Most preferably, the transition metal is zirconium or titanium.

The transition metal complex incorporates an indenoindolyl ligand that is bonded to the transition metal. Suitable indenoindolyl ligands and ways to name, synthesize, and incorporate them into transition metal complexes have been described in considerable detail elsewhere; see, for example, U.S. Pat. Nos. 6,838,410, 6,794,468, and 6,232,260, the teachings of which are incorporated herein by reference. Suitable procedures for making the ligands and complexes also appear in PCT Int. Appls. WO 99/24446 and WO 01/53360.

Preferably, the indenoindolyl ligand is bridged. By "bridged indenoindolyl ligand," we mean that the indenoindolyl group is joined to a second ligand by a divalent linking group. A wide variety of suitable linking groups are described in the art. The linking group can be a conjugated pi-electron system, but it need not be conjugated. Suitable divalent linking groups include dialkylsilyl, diarylsilyl, alkylboranyl, arylboranyl, alkylphosphinyl, arylphosphinyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. These and other divalent linking groups are described in the background references. (For some examples, see *J. Organometal. Chem.* 460 (1993) 191; 518 (1996) 1; 580 (1999) 90.)

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

Preferred bridged indenoindolyl ligands have a structure selected from the group consisting of:

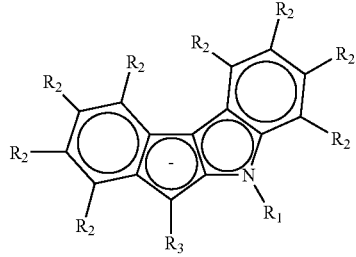

and

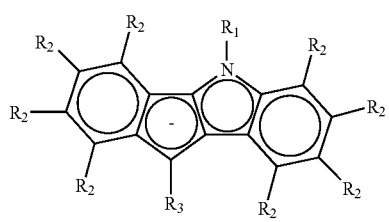

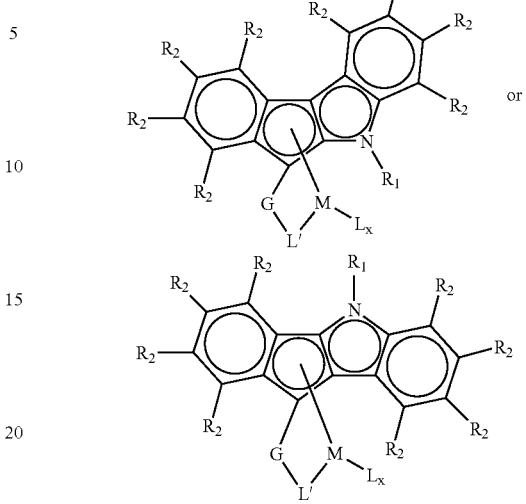

or in which $R_1$ is selected from the group consisting of $C_1$-$C_{30}$ hydrocarbyl, dialkylboryl, and trialkylsilyl; each $R_2$ is independently selected from the group consisting of $C_1$-$C_{30}$ hydrocarbyl, H, F, Cl, and Br; $R_3$ is selected from the group consisting of divalent radicals connected to a second ligand wherein the divalent radical is selected from the group consisting of hydrocarbyl and heteroatom containing alkylene radicals, diorganosilyl radicals, diorganogermanium radicals, organoboranyl radicals, organophosphinyl radicals, and diorganotin radicals.

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, and benzyl).

Bridged indenoindolyl ligands also include those used in open architecture complexes. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

In a preferred process of the invention, the bridged indenoindolyl complex has the general structure:

wherein M is a Group 3 to 10 transition metal; each L is independently selected from the group consisting of halide, alkoxy, aryloxy, siloxy, alkylamino, and $C_1$-$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_1$ is selected from the group consisting of $C_1$-$C_{30}$ hydrocarbyl, dialkylboryl and trialkylsilyl; each $R_2$ is independently selected from the group consisting of $C_1$-$C_{30}$ hydrocarbyl, H, F, Cl, and Br; G is a divalent radical is selected from the group consisting of hydrocarbyl and heteroatom-containing alkylene radicals, diorganosilyl radicals, diorganogermanium radicals, oranoboranyl radicals, organophosphinyl radicals, and diorganotin radicals.

The complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked with a second polymerization-stable ligand to give a linked ligand precursor. The final step normally involves reaction of the ligand precursor with a transition metal source to give the organometallic complex. The exact synthetic steps and the sequence used will normally depend upon the other ligands used and the transition metal source.

The process uses a catalyst system comprised in part of an indenoindolyl complex and a support. The support is preferably porous. It can be, for example, an inorganic oxide, an inorganic chloride, or an organic polymer resin. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of indenoindolyl complex added is preferably from 0.01 to 0.5 mmol per gram of support.

In one preferred embodiment, a solution of the activator is added to the support prior to the addition of the indenoindolyl complex. This solution can contain all or a portion of the activator to be used, but preferably, it contains all of the activator to be used. Any remaining activator is preferably added to the reactor at the start of the polymerization.

Even more preferably, the indenoindolyl complex is premixed with a solution of some or all of the activator prior to addition to the support. Preferably, the indenoindolyl complex and activator solution are premixed for a period of time between 1 minute and five hours.

The catalyst system is slurried with an inert solvent prior to addition to the reactor. The inert solvent is any liquid which does not interfere with the polymerization. Alkanes and cycloalkanes are preferred. Suitable inert solvents include isobutane, hexane, cyclohexane, isooctane, methylcyclopentane, and the like. The inert solvent can be a mixture of solvents, such as a mixture of isomeric hexanes. One preferred solvent mixture is Isopar G, available from ExxonMobil Chemical Company. Preferably, the inert solvent is used at a ratio of from 2 mL to 500 mL of inert solvent per gram of catalyst system. More preferably, the inert solvent is used at a ratio of from 10 mL to 100 mL of inert solvent per gram of catalyst system. The inert solvent is mixed with the catalyst system well enough to create a slurry. Generally, this is accomplished in a short time, often within a few seconds. However, longer mixing times can be used. Preferably, the inert solvent is mixed with the catalyst system for 0.5 to 100 minutes, more preferably for 1 to 20 minutes.

By slurrying the catalyst system with an inert solvent prior to addition to the reactor, we surprisingly increased the bulk density of the resulting polyethylene by at least 15% compared with the bulk density of polyethylene made under the same conditions but without slurrying the catalyst system with an inert solvent (see Table 1). Preferably, the increase in bulk density exceeds 20%; more preferably it exceeds 50%.

The polymerizations can be performed over a wide temperature range, such as about −30° C. to about 100° C. A more preferred range is from about 50° C. to about 80° C. Olefin partial pressures normally range from about 0.1 MPa to about 350 MPa. More preferred is the range from about 0.1 MPa to about 7 MPa.

The invention is performed as a slurry process. Thus, the benefits of the invention are not generally applicable to solution or gas-phase olefin polymerizations. Suitable slurry processes, sometimes referred to as horizontal or vertical "slurry loop" processes have been described frequently and thoroughly in many publications.

Catalyst concentrations used for the olefin polymerization depend on many factors. Preferably, however, the concentration ranges from about 0.01 micromoles transition metal per liter to about 100 micromoles per liter. Polymerization times depend on catalyst selection, catalyst concentration, temperature, and other factors. Generally, polymerizations are complete within several seconds to several hours.

The following examples merely illustrate the invention. Those skilled in the art will recognize many variations that are within the spirit of the invention and scope of the claims.

EXAMPLE 1

Preparation of 6,6'-Methylene-bis(2,5-dimethyl-5,6-dihydroindeno[2,-b ]indol-6-yl)zirconium dichloride, 1-4.

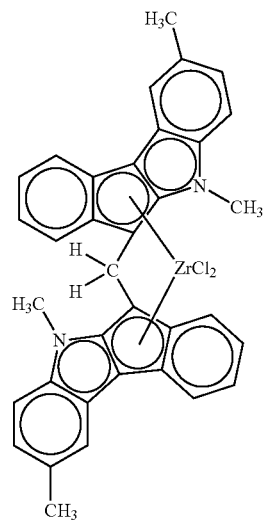

1-4

(a) Preparation of 2-methyl-5,6-dihydroindeno[2,1-b]indole (1-1) A 1-L, 3-neck flask equipped with mechanical stirrer, reflux condenser, and glass stopper is charged with 2-indanone (51.0 g, 0.39 mol) and p-tolylhydrazine hydrochloride (61.4 g, 0.39 mol). Glacial acetic acid (525 mL) is added at room temperature, and the mixture is vigorously stirred and heated to reflux. The mixture turns red, is heated for 2 hours, cools to room temperature, and is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is cooled and filtered over a pad of Celite. The filtrate is dried over $Na_2SO_4$, filtered, concentrated to 450 mL, and cooled to −30° C. for 3 days. The crystalline solid is filtered and washed with chilled (−78° C.) hexanes (2×500 mL), and the beige solid is collected and dried under vacuum (47.1 g, 55.6%). $^1$H NMR ($CD_2Cl_2$): 8.31 (br s, 1H, N—H), 7.65-7.63 (m, aromatic), 7.44-7.41 (m, aromatic), 7.35-7.33 (m, aromatic), 7.29 (m, aromatic), 7.08-7.01 (m, aromatic); total aromatic H=8, 3.75 (s, 2H, $CH_2$), 2.50 (s, 3H, ring $CH_3$).

(b) Preparation of 2,5-dimethyl-5,6-dihydroindeno[2,1-b]indole (1-2) A 500-mL, 3-neck flask equipped with mechanical stirrer, dropping additional funnel, and reflux condenser is charged with a solution of NaOH (42 mL, 21.5 M, 903 mmol) followed by $C_{16}H_{33}NMe_3Br$ (0.36 g, 0.97 mmol). Indenoindole product 1-1 (15.0 g, 68.4 mmol) is added under vigorous stirring followed by toluene (50 mL). A solution of methyl iodide (8.0 mL, 129 mmol) in toluene (15 mL) is added dropwise at room temperature, and the mixture is stirred at room temperature for 2.5 hours and at reflux for an hour. The mixture turns red and is cooled to room temperature and filtered. The crystalline solid is washed with chilled (−30° C.) ethanol (200 mL) followed by chilled hexanes (200 mL) to afford a pale red solid (10.3 g, 64.6%). $^1$H NMR (CD$_2$Cl$_2$): 7.62 (s, 1H, aromatic), 7.58 (d, J=7.2 Hz, 1H, aromatic), 7.43 (d, J=7.2 Hz, 1H, aromatic), 7.31 (t, J=7.0 Hz, 1H, aromatic), 7.27 (t, J=8.5 Hz, 1H, aromatic), 7.08-7.02 (m, 2H, aromatic), 3.80 (s, 3H, N—CH$_3$), 3.70 (s, 2H, CH$_2$), 2.50 (s, 3H, ring CH$_3$).

(c) Preparation of 6,6'-Methylene-bis(2,5-dimethyl-5,6-dihydroindeno[2,1-b]indole) (1-3) A slurry of 1-2 (9.32 g, 39.9 mmol) in degassed dimethylformamide (150 mL) is warmed to 70° C., sodium ethoxide (1.37 g, 20.1 mmol) is added under nitrogen, and the solid is dissolved to afford a dark orange solution. Formaldehyde (1.6 mL, 37 wt. % in H$_2$O, 20.8 mmol) is added after an hour, and a precipitate forms after 20 min. Solid ammonium chloride (2.55 g, 47.7 mmol) is added, the mixture is filtered, and the solid is washed with dimethylformamide (50 mL) followed by diethyl ether (50 mL). The solid is dissolved in methylene chloride (1.3 L) and washed with water (1 L). The layers are separated, and the organics are dried over sodium sulfate and filtered. The volatiles are removed under reduced pressure, and the solid is dried under vacuum (4.12 g, 42.8%).

(d) Preparation of 6,6'-Methylene-bis(2,5-dimethyl-5,6-dihydroindeno[2,1-b]indol-6-yl)zirconium dichloride (1-4). A mixture of 1-3 (2.18 g, 4.55 mmol) in diethyl ether (80 mL) is cooled to −78° C., and n-butyllithium (4.0 mL, 2.5 M in hexanes, 10.0 mmol) is added by syringe. The cold bath is removed, and a yellow solid forms upon warming to 23° C. The volatiles are removed after 18 hours, and the solid is washed with diethyl ether (20 mL) and dried under vacuum (1.84 g, 82.5%). The dianion (1.84 g, 3.75 mmol) is added to a solution of zirconium tetrachloride (0.88 g, 3.77 mmol) in toluene (80 mL) and diethyl ether (30 mL) to afford a red mixture, which is stirred overnight, filtered, and dried under vacuum (2.57 g, 78.2%).

EXAMPLE 2

Preparation of a Dimethylsilyl-bridged Indeno[1,2-b]indolylcyclopentadienyl zirconium dichloride complex (2)

Complex 2 is prepared as described in U.S. Pat. No. 6,908, 972, Example 1.

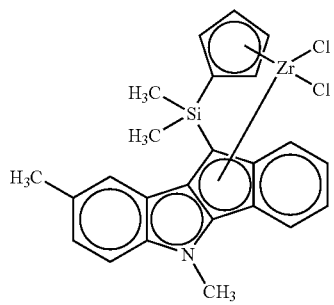

EXAMPLE 3

Preparation of an Indeno[1,2-b]indolylcyclopentadienyl zirconium dichloride complex (3)

Complex 3 is prepared as described in U.S. Pat. No. 6,908, 972, Comparative Example 6.

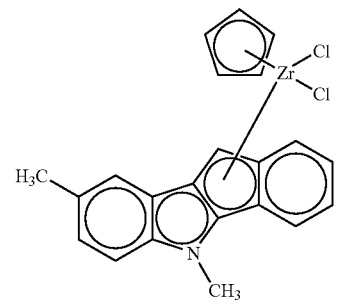

EXAMPLE 4

Preparation of an Open Architecture Indeno[1,2-b]indolyl Complex (4)

Complex 4 is prepared as described in U.S. Pat. No. 6,818, 713, Example 2.

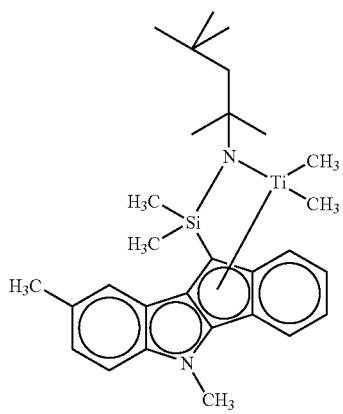

EXAMPLE 5

Preparation of a Catalyst System with Complex 1-4

Silica (CARiACT G-3, available from Fuji Silysia Chemical Ltd.) is heated under nitrogen from ambient temperature to 200° C. over 6 hours, held at 200° C. for 8 hours, and cooled to ambient temperature over 6 hours. In a glove-box, the calcined silica (2.0 g) is slurried with 18 mL of dry toluene, and 3.55 mL of a 30 wt. % solution of methylalumoxane (MAO) in toluene is added. The slurry is maintained for 30 minutes at room temperature and for 2 hours at 80° C. The slurry is cooled to room temperature, and volatiles are removed under vacuum to obtain 3.6 grams of MAO-treated silica.

In a glove-box, 0.15 mL of a 30 wt. % solution of methylalumoxane (MAO) in toluene is diluted with 2.8 mL of toluene, and 12 mg of complex 1-4 is slowly added. The solution is stirred for 1 hour at ambient temperature, and 1.50 g of the MAO-treated silica is slowly added. The slurry is stirred for 1 hour at room temperature and volatiles are removed under vacuum to obtain 1.65 g of powdered supported catalyst.

Trityl tetrakis(pentafluorophenyl)borate (10.6 mg) is dissolved in 2 mL of toluene and slowly added to 1.0 g of the supported complex in a flask with stirring. After stirring for 2 hours, the dark-green slurry is filtered, washed 4 times with anhydrous hexane, and vacuum dried at ambient temperature.

EXAMPLE 6

Polymerization with Slurried Catalyst System

A one-liter, stainless-steel reactor is charged with 1-butene (5 mL). Triisobutylaluminum (0.5 mL of 1.0 M solution in heptane, 0.5 mmol) and Armostat 710 fatty amine (1 mg, product of Akzo Nobel) in heptane solution (0.25 mL) are mixed in one sidearm of the injector. This mixture is then flushed into the reactor with nitrogen pressure and isobutane (about 400 mL). The reactor is then pressurized with ethylene to 2.1 MPa. The reactor contents are allowed to equilibrate at 75° C. The catalyst system prepared in Example 5 (0.30 g) is slurried with 5.0 mL of anhydrous hexane, and 0.25 mL of the slurry is loaded into the other injector arm and flushed into the reactor with isobutane (90 mL) and nitrogen pressure. When the polymerization is complete, the reactor is vented and the polyethylene is collected and dried by vacuum at 60° C. The polyethylene is predominantly a fine powder and has a bulk density of 0.25 g/cm$^3$.

COMPARATIVE EXAMPLE 7

Polymerization with Powder Catalyst System

The polymerization of Example 6 is repeated, but the catalyst system (15 mg) is added as a powder into the injector arm and is flushed into the reactor with isobutane (90 mL) and nitrogen pressure. The polyethylene is predominantly a fine powder and has a bulk density of 0.13 g/cm$^3$.

Example 6 shows that when the catalyst system is slurried with an inert solvent before addition, there is a large (92%) improvement in bulk density versus when it is simply added as a powder as in Comparative Example 7.

EXAMPLE 8

Preparation of Catalyst System with Complex 2

In a glove-box, 1.4 mL of a 30 wt. % solution of methylalumoxane (MAO) in toluene is diluted with 4.6 mL of toluene, and 68.2 mg of complex 2 is slowly added. The solution is stirred for 2 hours at ambient temperature, and 1.50 g of MAO-treated silica (prepared as in Example 5) is slowly added. The slurry is stirred for 1 hour at room temperature and volatiles are removed under vacuum to obtain 2.0 g of supported complex, which is a light-brown powder.

Trityl tetrakis(pentafluorophenyl)borate (57.4 mg) is dissolved in 6 mL of toluene and slowly added to 0.90 g of the supported complex in a flask with stirring. After stirring for 2 hours, the dark-green slurry is filtered, washed 4 times with anhydrous hexane, and vacuum dried at ambient temperature.

EXAMPLE 9

Polymerization with Slurried Catalyst System

The polymerization of Example 6 is repeated using 0.25 mL of a slurry of 0.30 g of the catalyst system prepared in Example 8 and 5.0 mL of anhydrous hexane. The polyethylene is predominantly a fine powder and has a bulk density of 0.34 g/cm$^3$.

COMPARATIVE EXAMPLE 10

Polymerization with Powder Catalyst System

The polymerization of Example 9 is repeated, but the catalyst system (15 mg) is added as a powder into the injector arm and is flushed into the reactor with isobutane (90 mL) and nitrogen pressure. The polyethylene is predominantly a fine powder and has a bulk density of 0.19 g/cm$^3$.

Example 9 shows that when the catalyst system is slurried with an inert solvent before addition, there is a large (79%) improvement in bulk density versus when it is simply added as a powder as in Comparative Example 10.

EXAMPLE 11

Preparation of Catalyst System with Complex 3

In a glove-box, 1.4 mL of a 30 wt. % solution of methylalumoxane (MAO) in toluene is diluted with 4.6 mL of toluene, and 64.3 mg of complex 3 is slowly added. The solution is stirred for 2 hours at ambient temperature and 1.50 g of MAO-treated silica (prepared as in Example 5) is slowly added. The slurry is stirred for 1 hour at room temperature, and volatiles are removed under vacuum to obtain 2.0 g of supported complex, which is a reddish-brown powder. The dried powder is washed 3 times with anhydrous hexane and vacuum dried at ambient temperature to obtain 1.96 g of beige powder.

EXAMPLE 12

Polymerization with Slurried Catalyst System

The polymerization of Example 6 is repeated using 0.25 mL of a slurry of 0.30 g of the catalyst system prepared in Example 11 and 5.0 mL of anhydrous hexane. The polyethylene is predominantly a fine powder and has a bulk density of 0.36 g/cm$^3$.

COMPARATIVE EXAMPLE 13

Polymerization with Powder Catalyst System

The polymerization of Example 12 is repeated, but the catalyst system (15 mg) is added as a powder into the injector arm and is flushed into the reactor with isobutane (90 mL) and nitrogen pressure. The polyethylene is predominantly a fine powder and has a bulk density of 0.30 g/cm$^3$.

Example 12 shows that when the catalyst system is slurried before addition, there is a large (20%) improvement in bulk density versus when it is simply added as a powder as in Comparative Example 13.

EXAMPLE 14

Preparation of Catalyst System with Complex 4

In a glove-box, 35.3 mg of complex 4 is placed in a flask and a slurry of 1.1 g of MAO-treated silica (prepared as in Example 5) in 5 mL of toluene is added. The slurry is stirred for 1 hour at room temperature and volatiles are removed under vacuum to obtain 1.14 g of supported complex. The powder is washed 3 times with anhydrous hexane and vacuum dried at ambient temperature to obtain 1.13 g of beige powder.

EXAMPLE 15

Polymerization with Slurried Catalyst System

The polymerization of Example 6 is repeated using 0.25 mL of a slurry of 0.179 g of the catalyst system prepared in Example 14 and 6.0 mL of anhydrous hexane. The polyethylene has a bulk density of 0.28 g/cm$^3$. The polyethylene is a mixture of powder with 22% by weight of agglomerated polyethylene.

COMPARATIVE EXAMPLE 16

Polymerization with Powder Catalyst System

The polymerization of Example 15 is repeated, but the catalyst system (15 mg) is added as a powder into the injector arm and is flushed into the reactor with isobutane (90 mL) and nitrogen pressure. The polyethylene has a bulk density of 0.18 g/cm$^3$. The polyethylene is a mixture of powder with 63% by weight of agglomerated polyethylene.

Example 15 shows that when the open architecture indenoindolyl catalyst system is slurried before addition, there is a large (56%) improvement in bulk density and a large decrease in the amount of agglomerated polyethylene (22% versus 63%) versus when it is simply added as a powder as in Comparative Example 16.

COMPARATIVE EXAMPLE 17

Polymerization with Bis-Cyclopentadienyl Slurried Catalyst System

The polymerization of Example 6 is repeated using 0.25 mL of a slurry prepared from 5.0 mL of anhydrous hexane and 0.30 g of the catalyst system prepared as in Example 11, but using 56.6 mg of bis-n-butylcyclopentadienyl zirconium dichloride (available from Boulder Scientific Company) rather than Complex 3. The polyethylene is predominantly a fine powder and has a bulk density of 0.39 g/cm$^3$.

COMPARATIVE EXAMPLE 18

Polymerization with Powder Catalyst System

The polymerization of Example 17 is repeated, but the catalyst system (15 mg) is added as a powder into the injector arm and is flushed into the reactor with isobutane (90 mL) and nitrogen pressure. The polyethylene is predominantly a fine powder and has a bulk density of 0.36 g/cm$^3$.

Comparative Examples 17 and 18 show that when the catalyst system is based upon cyclopentadienyl ligands, the effect on bulk density of slurry addition is much smaller (8% improvement) versus that seen with indenoindolyl ligands (20-92% improvement).

The results of the polymerizations are summarized in Table 1.

TABLE 1

| Examples | Complex | Type | Bulk density g/cm$^3$ Slurry | Bulk density g/cm$^3$ Powder | Increase |
| --- | --- | --- | --- | --- | --- |
| 6, C7 | 1-4 | Bridged Indenoindolyl | 0.25 | 0.13 | 92% |
| 9, C10 | 2 | Bridged Indenoindolyl | 0.34 | 0.19 | 79% |
| 12, C13 | 3 | Non-bridged Indenoindolyl | 0.36 | 0.22 | 20% |
| 15, C16 | 4 | Bridged (Open architecture) Indenoindolyl | 0.28 | 0.18 | 56% |
| C17, C18 | (BuCp)$_2$ZrCl$_2$ | No Indenoindolyl ligand | 0.39 | 0.36 | 8% |

All of the polymerizations with indenoindolyl-based complexes have a large increase in bulk density when used in slurry form. The effect is most pronounced for bridged indenoindolyl complexes. When the complex does not contain an indenoindolyl ligand, there is only a small increase in bulk density.

The preceding examples are meant only as illustrations. The following claims define the invention.

We claim:

1. A process which comprises polymerizing ethylene in a slurry reaction in the presence of a catalyst system which comprises an activator and an indenoindolyl transition metal complex on a support, wherein the activator is selected from the group consisting of alumoxanes, organoboranes, ionic borates, and combinations thereof, and the catalyst system is slurried with an inert solvent prior to addition and added as a slurry to the reactor to produce polyethylene having a bulk density at least 15% greater than that of polyethylene made under the same conditions but without slurrying the catalyst system with an inert solvent wherein the indenoindolyl transition metal complex has a structure selected from the group consisting of:

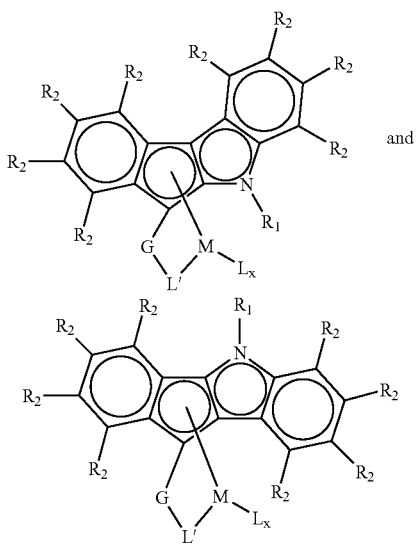

wherein M is a Group 3 to 10 transition metal; each L is independently selected from the group consisting of halide, alkoxy, aryloxy, siloxy, alkylamino, and $C_1$-$C_{30}$ hydrocarbyl; L' is selected from the group consisting of alkylamido, substituted or unsubstituted cyclopentadienyl, indenyl, boraaryl, pyrrolyl, azaborolinyl and indenoindolyl; x satisfies the valence of M; $R_1$ is selected from the group consisting of $C_1$-$C_{30}$ hydrocarbyl, dialkylboryl and trialkylsilyl; each $R_2$ is independently selected from the group consisting of $C_1$-$C_{30}$ hydrocarbyl, H, F, Cl, and Br; G is a divalent radical selected from the group consisting of hydrocarbyl and heteroatom-containing alkylene radicals, diorganosilyl radicals, diorgano-germanium radicals, organoboranyl radicals, organophoshinyl radicals, and diorganotin radicals.

2. The process of claim 1 wherein the catalyst system is slurried with from 2 to 500 mL of inert solvent per gram of catalyst system prior to addition to the reactor.

3. The process of claim 2 wherein the catalyst system is slurried with from 10 to 100 mL of inert solvent per gram of catalyst system prior to addition to the reactor.

4. The process of claim 1 wherein the support is silica.

5. The process of claim 4 wherein the activator is combined with the silica prior to addition of the indenoindolyl transition metal complex to the silica.

6. The process of claim 1 wherein L' is selected from the group consisting of substituted or unsubstituted cyclopentadienyl, indenyl, and indenoindolyl.

7. The process of claim 1 wherein the activator is methylalumoxane.

8. The process of claim 1 comprising polymerizing ethylene in the presence of a second olefin.

9. The process of claim 1 wherein the polymerization is performed at a temperature within the range of about 30° C. to about 100° C.

* * * * *